Dec. 3, 1935. F. L. COOK 2,022,954
ORANGE PEELER
Filed Nov. 21, 1934
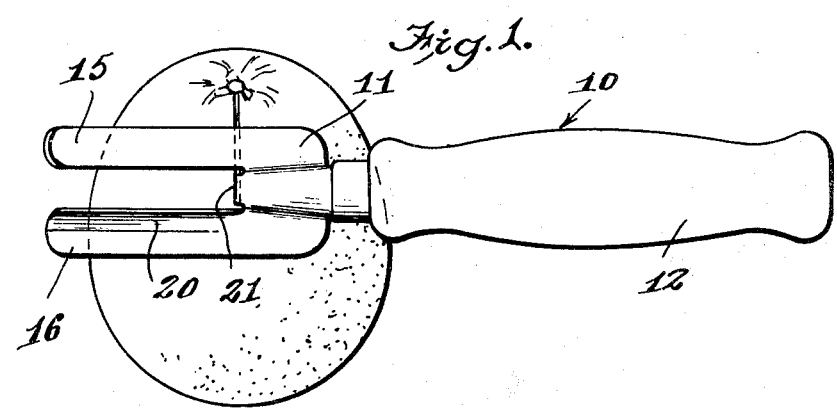
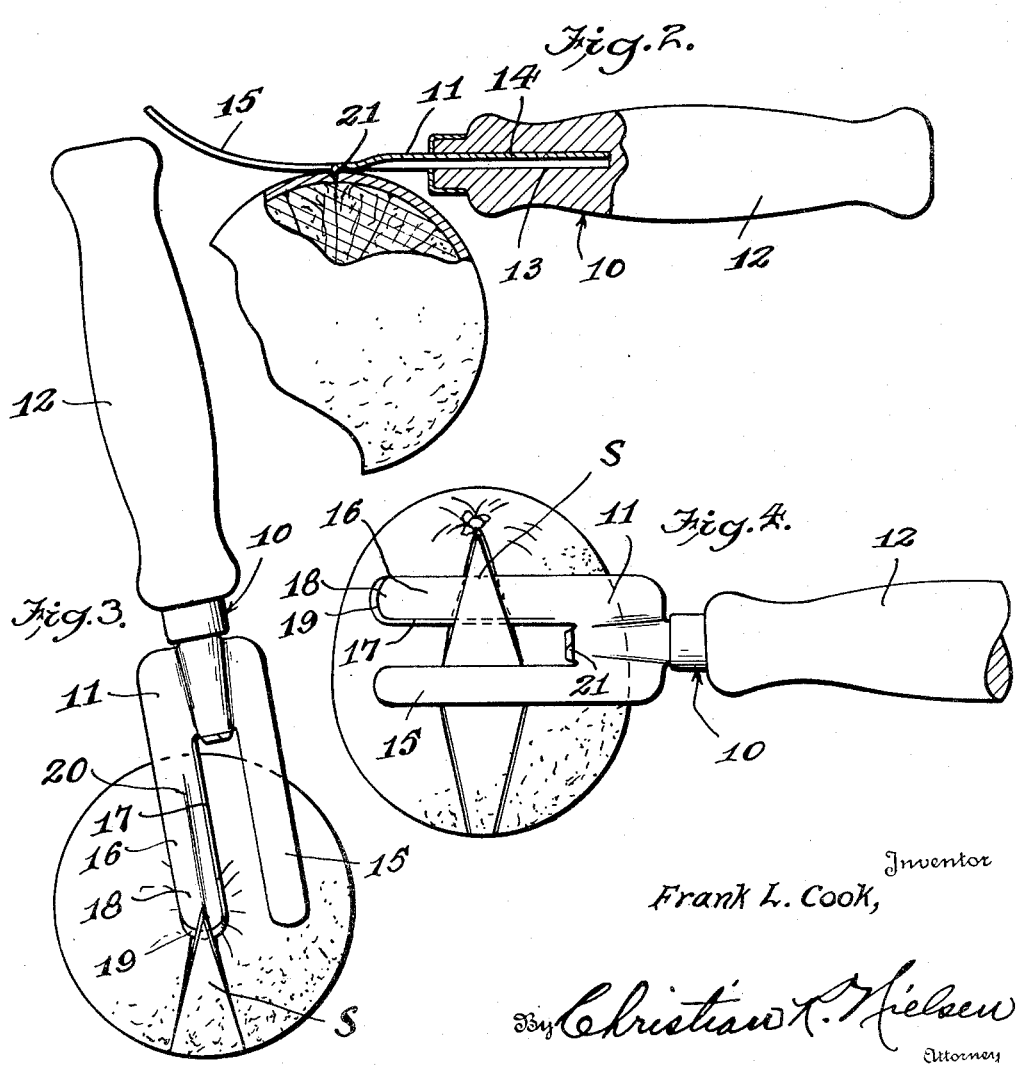
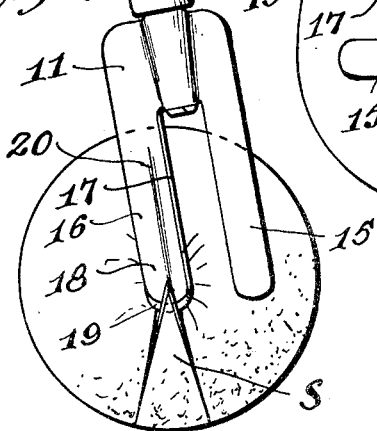
Inventor
Frank L. Cook,
By Christian L. Nielsen
Attorney Patented Dec. 3, 1935

2,022,954

UNITED STATES PATENT OFFICE 2,022,954

ORANGE PEELER

Frank L. Cook, South Bend, Ind.

Application November 21, 1934, Serial No. 754,167

3 Claims. (Cl. 146—3)

This invention relates to an orange peeler, and it consists in the constructions, arrangement and combinations herein described and claimed.

It is an object of the invention to provide a tool of a simple nature which will permit the cutting and removal of the rind of an orange without the necessity of actually touching the meat of the orange.

It is also an object of the invention to provide a device of the character described which may be stamped from metal thus making the device saleable at a very low cost.

Additional objects, advantages and features of invention will be apparent from the following description and accompanying drawing, wherein Figure 1 is a top plan view of my device, illustrating the first stage of cutting the rind of an orange.

Figure 2 is a side elevation thereof, partly in section.

Figure 3 is a top plan view of my instrument, illustrating the first stage of removal of the rind.

Figure 4 is a similar view illustrating the manner of removing a severed portion of the rind.

There is illustrated an instrument generally indicated at 10, including a fork-like body member 11 to which a handle 12 is affixed. In the present instance, the handle 12 is apertured as at 13, and received the shank 14 of the fork-like member.

The fork-like member 11 comprises a pair of broad tines 15 and 16, these tines being extended from the shank 14 in spaced relation providing an open space therebetween. The tines 15—16 are given a slight curvature as clearly seen in Figure 2, and the inner edge of the tine 16 is provided with a tapered edge 17, which functions to "break" the rind from the orange, as will be more fully explained hereinafter. The edge 17 may, if desired, be sharpened, in which event a cutting action would be involved. The point 18 of the tine 16 is bevelled slightly to define a cutting edge 19 which functions to make the initial "break" of the rind from the orange, as clearly shown in Figure 3, and preferably, this tine is given a slight longitudinal bend as at 20, forming a trough, which acts to retain the rind upon the tine during breaking of the rind from the orange.

A cutting blade 21 is struck downwardly from the body member 11, and is positioned between the tines 15—16. The blade 21 is of a length so as to penetrate the rind without materially cutting or severing the orange pulp. The blade 21 is integrally formed with the body and preferably is extended in a direction opposite the curvature of the tines 15—16.

In use, the peeler 10 is grasped in such position that the blade 21 may be inserted into the rind of an orange and this insertion is preferably made at an axial center and the peeler is then drawn circumferentially around the orange to a point diametrically opposite thereto. A similar incision is made spaced somewhat from the first cut but meeting the first incision at the centers of the orange. The user now inserts the cutting edge 19 of the tine 16 beneath the rind at the center of the orange, as clearly shown in Figure 3. The rind will follow the trough 20 upon movement of the peeler 10 theretoward. After the rind adjacent the center of the orange has been loosened sufficiently, the peeler is withdrawn, and reversed so that the curved portions of the tines embrace the orange, with the strip S of the rind disposed below the tine 15 and above the tine 16. The strip S may now be readily removed by giving a rocking movement to the peeler, the edge 17 of the tine 16 serving to gently part the rind from the skin without liability of injury to the orange proper. Similar sections of rind may be removed until the entire rind has been removed.

While I have shown and described a preferred embodiment of the invention, I am aware that structural changes may be made without departing from the spirit of the invention, and I therefore consider as my own, all such modifications as fairly fall within the scope of the appended claims.

I claim:—

1. An orange peeler comprising a body member having a handle and a pair of parallel spaced tine members, a cutting blade formed at the base of and between the tine members and extended at right angles thereto, one of said tine members having a bevelled point and an inner bevelled longitudinal edge.

2. An orange peeler comprising a body member having a handle and a pair of parallel spaced tine members, a cutting blade formed at the base of and between the tine members and extended at right angles thereto, one of said tine members having a bevelled point and a bevelled longitudinal edge, and said tine further having a groove extending longitudinally inward from the point.

3. An orange peeler comprising a body member having a handle and a pair of parallel spaced curved tine members, a cutting blade formed at the base of and between the tine members and extended at right angles thereto in a direction opposite the curvature of the tines, one of said tine members having a bevelled point and a bevelled longitudinal edge, and said tine further having a groove extending longitudinally inward from the point.

FRANK L. COOK.